Figure 1:
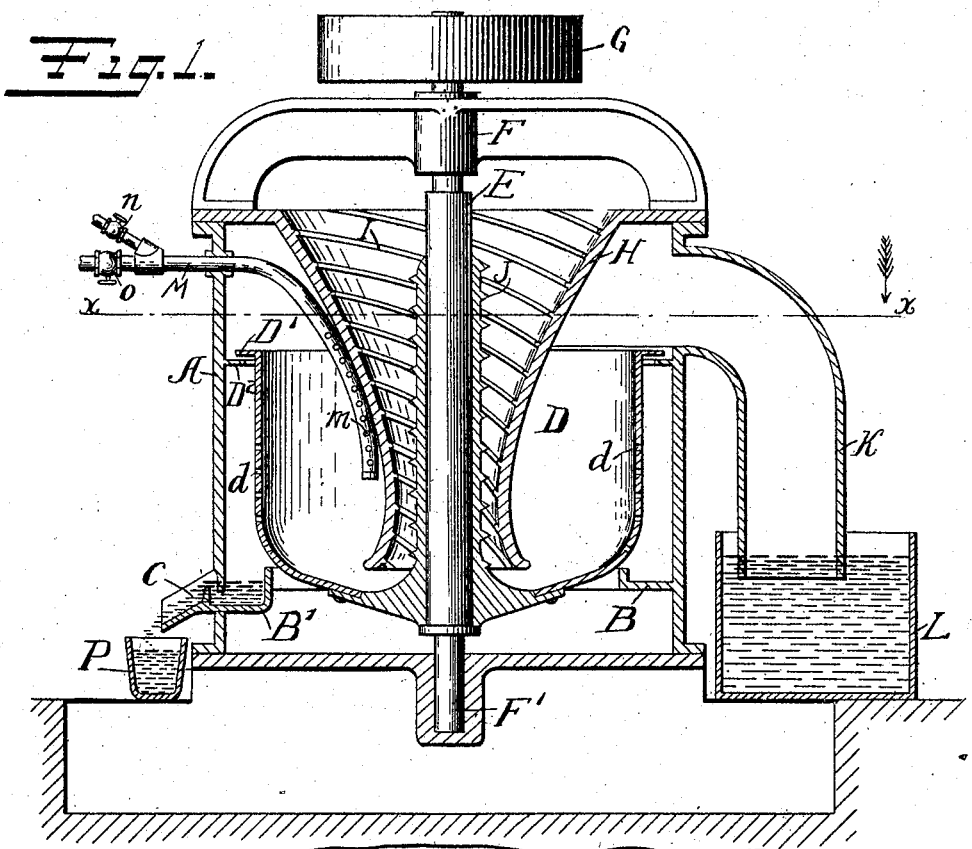

No. 800,222. PATENTED SEPT. 26, 1905.
M. LEITCH.
FURNACE.
APPLICATION FILED APR. 2, 1904.

Witnesses
Chas. O. Beard
L. Vreeland

Inventor
Meredith Leitch
By his Attorneys
Bartlett Brownell & Mitchell

UNITED STATES PATENT OFFICE.

MEREDITH LEITCH, OF BROOKLYN, NEW YORK, ASSIGNOR TO SHEET METAL RECOVERY COMPANY, A CORPORATION OF NEW JERSEY.

FURNACE.

No. 800,222.        Specification of Letters Patent.        Patented Sept. 26, 1905.

Application filed April 2, 1904. Serial No. 201,230.

*To all whom it may concern:*

Be it known that I, MEREDITH LEITCH, a citizen of the United States, residing at Brooklyn, county of Kings, and State of New York, have invented certain new and useful Improvements in Furnaces, of which the following is a full, clear, and exact description.

My invention relates to a new furnace by which can be carried out a continuous process of separating materials of different melting temperatures without oxidation. It is particularly adapted for use in separating solder from tin cans and the like. Heretofore attempts have been made to separate materials of these sorts by the simple heating of the mass to a degree sufficiently high to melt the incombustible material of low melting temperature and permit such melted material to flow from the incombustible material of high melting temperature under the action of gravity. In carrying out that process, however, it has been found that the action of gravity is by no means sufficient to cause the melted material to flow from the unmelted material, the result being that a great deal of the melted material adheres to the material of high melting temperature in the form of drops or globules, and therefore fails to be separated therefrom. Moreover, the arrangement has been such that the process above referred to, so far as I know, has always been carried out in the presence of oxygen, with the result that the material of low melting temperature has been very largely oxidized, and therefore to a great extent lost. Moreover, that process is not a continuous process, but one in which separate charges are treated one at a time.

One object of my invention is to provide a furnace which permits of the continuous feeding of the mixed material and the continuous taking out of the unmelted material, so that the apparatus may be kept in operation during long periods.

Another object of my invention is to provide means such that the materials while heated do not come in contact with the air, so that there is no danger of oxidation.

Another object is to provide in the preferred embodiment means which bring about the separation more completely by causing a greater separating force than gravity to be exerted.

In addition to separating solder from cans my invention can be used for separating native metals from their ores and for similar purposes.

Although in some embodiments of my invention other separating forces may be relied on, I preferably make use of centrifugal force, which can easily be made to be many times greater than the action of gravity.

The following is a description of apparatus embodying my invention, reference being had to the accompanying drawings, in which—

Figure 2:
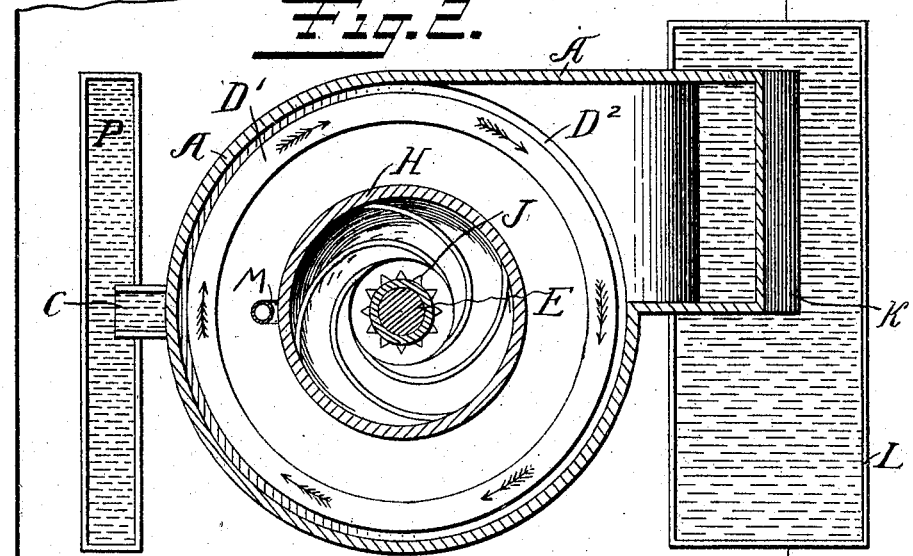

Figure 1 is a vertical section of my apparatus; and Fig. 2 is a horizontal section on the line $x$ $x$, Fig. 1.

Referring more particularly to the drawings, A represents an inclosing wall provided with a gutter B and a spout C, the gutter having a trap B' formed at the spout for preventing the egress of products of combustion when filled with molten metal. Within the chamber formed by the wall A is a revolving basket or centrifugal separator D, preferably of steel, mounted upon the shaft E, which is supported by bearings F F' and is driven by the pulley G. This basket D is provided with perforations $d$ in its sides for the purpose hereinafter described. The bearings F F' are of any well-known type suitable for use in connection with a vertical heated shaft. Within the basket D extends a hopper H, preferably conical in form, as shown. This hopper forms a cover for the chamber formed by the wall A, being supported by the upper edge of said wall, so as to seal the upper part of the chamber. The hopper is provided with ribs I, which coact with teeth J on the revolving sleeve surrounding the shaft E in such a way as to assist in forcing the material placed within the hopper downward within the basket D. The upper part of the chamber, formed by the wall A and the hopper H, is provided with an outlet K, the lower end of which dips into the tank of water L, so as to be sealed thereby. The upper edge of the basket D is provided with a horizontal flange D', which extends over a horizontal flange D², carried by the wall A, so as to substantially prevent matter rising above the edge of the basket from passing between the upright wall of the basket D and the wall A. A pipe M extends through the wall A and into the basket D, where it is provided with orifices $m$. Through this pipe is supplied a mixture of gas and air from pipes N and O, respectively, said pipes being provided with valves n and o for controlling the supply of gas and air in such a way that the proportions shall be those necessary for the burning of the gas within the furnace without the leaving of any free oxygen.

In carrying out my method with the apparatus above described I feed a mixture of materials of high and low melting temperatures into the hopper H, meanwhile revolving the basket D by means of power applied to pulley G, the gas-and-air mixture being supplied and ignited so as to raise the temperature within the furnace to that required for melting the incombustible material of low melting temperature. The revolution of the basket, together with the sleeve connected thereto bearing the pins J, feeds the material placed in the hopper downward into the basket, where it is subjected to the action of heat and centrifugal force, with the result that as soon as the material of low melting temperature is melted it is thrown off by centrifugal force through the perforations d in the sides of the basket. This molten material falls into the trough B and is carrid thereby to the spout C, from which it discharges into the crucible or mold P, provided for its reception. The matter which is fed into the hopper H being pressed downward crowds the incombustible material of high melting temperature, which is in the basket D, upward until it passes above the flange D', at which time the centrifugal force throws it outward to the exit K, provided for that purpose, by which it is conducted into the tank L. As before stated, the tank L and the trap B' act to prevent the egress of products of combustion through either of these orifices. The products of combustion due to the burning of the gas-and-air mixture within the furnace can find exit only through the opening in the hopper H and in passing out through the hopper constitute a gas seal and prevent the ingress of air at that point. The atmosphere within the furnace is therefore entirely deoxidized, and no oxidation of the material treated takes place within the furnace. This sealing of the openings for feeding the furnace and for removing such material as is removed during the continuous operation is of great importance where there is danger of loss being incurred by oxidation and constitutes a valuable feature of my invention apart from the particular separating means described.

My apparatus permits of various modifications such as might suggest themselves to a skilled mechanic. Thus, for instance, it is not necessary to generate the heat within the basket or to use an air-and-gas mixture for that purpose, since various other methods of supplying heat to the furnace can be used, such as are used in furnaces of other types and for other purposes when a deoxidized atmosphere is desired. Moreover, the use of the centrifugal furnace is not necessarily confined to the use of a deoxidized atmosphere, since for some purposes it might be useful where the atmosphere was not deoxidized. Moreover, a different separating means not employing centrifugal force may be employed with my deoxidized chamber.

I have not shown means for continuously feeding material to the hopper H or removing it from the tank L, since any suitable means known to the art can be used for those purposes.

The apparatus is simple and efficient in its action, producing, as above pointed out, very valuable results, and constitutes a marked improvement over any means heretofore employed in attempting to attain the end desired.

The process herein set forth is made the subject of a divisional application, Serial No. 226,305, filed the 28th day of September, 1904.

What I claim is—

1. In a separating-furnace, the combination of a chamber having a receiving-opening, means for heating said chamber, and means for automatically forming a gas seal for preventing the passage of air through said receiving-opening when the furnace is in operation, said furnace being sealed against the passage of air at all other points.

2. In a separating-furnace, the combination of a chamber having receiving and discharge openings, means for heating said chamber, means for forming a gas seal for preventing the passage of air through said receiving-opening and a liquid seal for said discharge-opening.

3. In a furnace for separating materials of different melting temperatures, the combination of a chamber having receiving and discharge openings, means for heating said chamber so as to melt the material having the lower melting temperature, means for forming a gas seal for preventing the passage of air through said receiving-opening and a liquid seal for said discharge-opening and means for causing the unmelted portion of the materials fed into said chamber to be automatically discharged through said sealed discharge-opening.

4. In a furnace for separating materials of different melting temperatures, the combination of a chamber having receiving and discharge openings, means for creating a deoxidized atmosphere within said casing having a temperature sufficiently high to melt the lower of said materials, means for sealing said openings so as to prevent the circulation of air therethrough and means for automatically discharging from said chamber the unmelted portions of the materials fed thereto.

5. In a furnace for separating materials of different melting temperatures, the combination of a chamber having a receiving-opening, means for heating said chamber, means for forming a gas seal for said receiving-opening and a revolving receptacle in said chamber for the materials to be separated, said receptacle being adapted to give the materials a progressive movement.

6. In a furnace for separating materials of different melting temperatures, the combination of a chamber having receiving and discharge openings, means for heating said chamber, means for forming a gas seal for said receiving-opening and a liquid seal for said discharge-opening, and a revolving receptacle in said chamber for the materials to be treated, said receptacle being adapted to give the materials therein a progressive movement and to discharge the unmelted portion thereof through said sealed discharge-opening.

7. In a furnace for separating materials of different melting temperatures, the combination of a chamber having a gas-sealed receiving-opening, means for heating said chamber, and a centrifugal separator therein.

8. In a furnace for separating materials of different melting temperatures, the combination of a chamber having receiving and discharge openings, means for heating said chamber, means for forming a gas seal for said receiving-opening and a liquid seal for said discharge-opening and a centrifugal separator in said chamber adapted to receive the materials through said sealed receiving-opening and discharging the unmelted portion thereof through said sealed discharge-opening.

9. In a furnace for separating materials of different melting temperatures, the combination of a chamber, a centrifugal separator therein, a hopper depending into said separator and concentric with the axis thereof, one of the opposing surfaces of said hopper and the shaft of said separator having a feeding-spiral thereon.

10. In a furnace for separating materials of different melting temperatures, the combination of a chamber having a sealed receiving-opening, means for heating said chamber, a revoluble receptacle within said chamber, means for revolving said receptacle whereby molten material within said receptacle is thrown off by the centrifugal force thus generated, a discharge-exit from said chamber for the unmelted portion of the matter treated therein, and a liquid seal for said exit.

Signed at New York city, New York, this 31st day of March, 1904.

MEREDITH LEITCH.

Witnesses:
 H. B. BROWNELL,
 L. VREELAND.